United States Patent
Miyake

(10) Patent No.: US 12,413,404 B2
(45) Date of Patent: Sep. 9, 2025

(54) CROSS-REFERENCING DEVICE

(71) Applicant: Hitachi Astemo, Ltd., Hitachinaka (JP)

(72) Inventor: Junji Miyake, Tokyo (JP)

(73) Assignee: HITACHI ASTEMO, LTD., Ibaraki-Ken (JP)

( * ) Notice: Subject to any disclaimer, the term of this patent is extended or adjusted under 35 U.S.C. 154(b) by 282 days.

(21) Appl. No.: 17/792,543

(22) PCT Filed: Jan. 15, 2021

(86) PCT No.: PCT/JP2021/001181
§ 371 (c)(1),
(2) Date: Jul. 13, 2022

(87) PCT Pub. No.: WO2021/186867
PCT Pub. Date: Sep. 23, 2021

(65) Prior Publication Data
US 2023/0108551 A1 Apr. 6, 2023

(30) Foreign Application Priority Data
Mar. 18, 2020 (JP) .................. 2020-048459

(51) Int. Cl.
*H04L 9/08* (2006.01)

(52) U.S. Cl.
CPC .......... *H04L 9/0863* (2013.01); *H04L 9/0872* (2013.01); *H04L 9/0894* (2013.01)

(58) Field of Classification Search
CPC ... H04L 9/0863; H04L 9/0872; H04L 9/0894; H04L 9/3228; G06F 21/31
See application file for complete search history.

(56) References Cited

U.S. PATENT DOCUMENTS

| | | | |
|---|---|---|---|
| 7,484,245 B1 * | 1/2009 | Friedman ................ | G06F 21/62 726/28 |
| 8,799,655 B1 * | 8/2014 | Dotan ................ | H04W 12/068 713/168 |

(Continued)

FOREIGN PATENT DOCUMENTS

| | | |
|---|---|---|
| JP | 2005-050292 A | 2/2005 |
| JP | 2007-018140 A | 1/2007 |

(Continued)

OTHER PUBLICATIONS

Tetsuo Kobayashi, ITmedia. "One-time password (Wantaimu password)Keyword for understanding technology and trends." Published at 11:55 on Jul. 6, 2006. <https://www.itmedia.co.jp/enterprise/articles/0607/06/news011.html>.

*Primary Examiner* — Hany S. Gadalla
(74) *Attorney, Agent, or Firm* — Volpe Koenig

(57) ABSTRACT

To realize one-time password cross-referencing at low cost. A cross-referencing device includes a clock unit which keeps time by a built-in clock, and an authentication calculation unit which has a minor password FIFO capable of storing (N+1) numerical values from a last written numerical value to a numerical value written N (N being a natural number) before and which generates a time-synchronized first cross-referencing one-time password at a time point having a predetermined time relationship with the current time at predetermined first time interval on the basis of the time indicated by the clock, writes the same in the minor password FIFO, and determines that authentication is successful where an authentication target one-time password received in a first authentication request matches with any of the (N+1) first cross-referencing one-time passwords in the minor password FIFO.

9 Claims, 9 Drawing Sheets

(56) References Cited

U.S. PATENT DOCUMENTS

| | | | |
|---|---|---|---|
| 10,095,859 B2 | 10/2018 | Miyake | |
| 2008/0270791 A1* | 10/2008 | Nystrom | H04L 63/0807 |
| | | | 713/155 |
| 2011/0130120 A1* | 6/2011 | Hoeksel | H04W 12/068 |
| | | | 455/411 |
| 2013/0227677 A1* | 8/2013 | Pal | H04L 63/105 |
| | | | 726/19 |
| 2015/0161367 A1* | 6/2015 | Lu | G06F 21/31 |
| | | | 726/19 |
| 2016/0371481 A1* | 12/2016 | Miyake | H04L 9/3228 |
| 2019/0306153 A1* | 10/2019 | Girdhar | G06F 21/45 |
| 2020/0112585 A1* | 4/2020 | Keohane | G06F 21/316 |

FOREIGN PATENT DOCUMENTS

| | | |
|---|---|---|
| JP | 2014-215853 A | 11/2014 |
| JP | 6078686 B2 | 2/2017 |
| JP | 2019-175197 A | 10/2019 |

* cited by examiner

CROSS-REFERENCING DEVICE

TECHNICAL FIELD

The present invention relates to an authentication technique for determining whether or not a subject has an authority to access an object.

BACKGROUND ART

User authentication used for online banking or the like is executed conventionally on the premise of the unity of possession that a legitimate user owns a physical device called a hardware token, and a person who accesses using the hardware token is the legitimate user.

FIG. 1 is a conceptual diagram showing a procedure for user authentication in online banking using a hardware token.

A hardware token 100 is distributed to a user 102 who has an account in online banking managed by an online banking server 103. A clock 101 which accurately synchronizes with a clock 104 of the online banking server 103 is provided inside the hardware token 100. The time in the clock 101 inside the hardware token 100 is not capable of easily being set by a person other than the manufacturer. Further, a passphrase 110 which is a common key unique to each user and shared with the online banking server 103 is stored inside the hardware token 100. Due to the tamper resistance of the hardware token 100, the passphrase 110 cannot be deciphered even if the hardware token 100 is disassembled.

When the user 102 attempts to log in to the online banking server 103, the user 102 inputs a one-time password (OTP: One Time Password) 111 displayed on the hardware token 100 as the OTP 112 from a password input screen (not shown) or the like. In this way, the one-time password is disclosed to the online banking server 103. The online banking server 103 uses the passphrase 110 shared with the hardware token 100 to determine whether the OTP 112 disclosed from the user 102 is legitimate.

The one-time password is calculated from a one-way hash function by using the same algorithm on both the hardware token 100 and the online banking server 103 and inputting the current time and the passphrase 110 for each predetermined time increment by the clocks 101 and 104.

Thus, as long as the two clocks 101 and 104 are synchronized, the OTP 111 displayed on the hardware token 100 and the one-time password related to the user 102 calculated inside the online banking server 103 match each other. User authentication is executed by confirming their match.

Further, since the OTP 111 is calculated using the current time of the clock 101, the OTP 111 changes every predetermined time increment. Therefore, even if a malicious third party eavesdrops on an online authentication signal and illegally obtains a one-time password, the one-time password becomes invalid after a predetermined time has passed. Authentication in a replay attack in which a malicious third party misrepresents a user and discloses the one-time password 111 obtained by eavesdropping to the online banking server 103 at different from a timing that at the time of eavesdropping is not successful. The replay attack refers to an attack method in which an eavesdropper on a communication channel records past information and sequences flowing in the communication channel as they are, and then throws this information and sequences as they are to an attack target thereby to attempt to deceive the attack target.

This type of one-time password is called a time-synchronized one-time password. As one of the core parts of the time-synchronized one-time password technology, there is known a method of matching the time of the clock 101 of the hardware token 100 with the time of the clock 104 of the online banking server 103. Various techniques for matching the times of the two clocks 101 and 104 have been devised and disclosed (refer to, for example, Patent Literature 1). There has been disclosed in Patent Literature 1, a technique in which a receiving unit of a radio clock is provided inside a terminal for authentication (corresponding to the hardware token 101 described above) to receive a standard radio wave of time, thereby precisely synchronizing a clock inside the terminal and a clock inside a server.

Further, there has been disclosed in Non-Patent Literature 1, a technique of allowing a clock deviation for a certain period of time between a terminal and a server and absorbing the deviation on the server side.

CITATION LIST

Patent Literature

PTL 1: Japanese Unexamined Patent Publication No. 2005-50292
PTL 2: Japanese Patent No. 6078686

Nonpatent Literature

NPTL 1: Itmedia. co.jp, "Keyword this time, for understanding technology and trends: One-time password (wantaimu password) (3/4)], [online], Jul. 6, 2006, ITmedia Enterprise (ITmedia is Registered Trademark), [Searched on February 3, 2nd year of Reiwa), Internet,
<https://www.itmedia.co.jp/enterprise/articles/0607/06/news011_3.html>

SUMMARY OF INVENTION

Technical Problem

In the technique disclosed in Patent Literature 1, the cost of the terminal for authentication increases by the portion of the receiving unit which receives the standard radio wave. Further, the place where the terminal is installed is limited to the place where the standard radio wave can be received.

On the other hand, since the technique of Non-Patent Literature 1 allows the clock deviation for the certain period of time between the terminal and the server, the terminal does not have to be provided with a receiving unit for receiving a standard radio wave.

FIG. 2 is a diagram for outlining the technique of Non-Patent Literature 1, and is one in which the technique disclosed in Non-Patent Literature 1 is brought into a flowchart.

Referring to FIG. 2, user authentication is started from Step S200. In a determination Step S201, the server determines whether or not there is an authentication request from the user's terminal. If there is the authentication request, the server proceeds to Step S202, and if not so, the server proceeds to Step S207 where this procedure is ended.

In Step S202, since the server can identify the user who requested the authentication, it can recognize the characteristics of the hardware token owned by the user stored in the server in advance, that is, the passphrase and the time deviation attribute of the hardware token with respect to the server clock (information on how much the hardware token is behind/advanced with respect to the server clock).

Accordingly, the current time inside the hardware token can be estimated based on this information. For a total of 5 consecutive times of the current time recognized by the hardware token and the time having an offset in 1-minute increments up to t 2 minutes thereof, it is possible to generate a password sequence on demand at once.

In Step S203, the server determines whether or not a password matching the password received from the terminal together with the authentication request exists in the five-point password sequence. When there is no match, the server declares "authentication NG" in Step S206 and ends the processing (Step S207).

When there is a match, the server proceeds to Step S204 and updates the time deviation (time deviation attribute) of the clock of the hardware token, based on the offset corresponding to the matched password. This corresponds to learning the time deviation attribute of the clock of the hardware token by the range of 0±2 in units of time ticking when the password changes.

Then, the server declares "authentication OK" in Step S205, and ends the processing in Step S207.

Even in both the technique of Patent Literature 1 and the technique of Non-Patent Literature 1 described above, the cross-referencing of the one-time password is executed on the server side having a relatively high processing capacity as hardware. However, as a target for applying one-time password authentication, it may be required to perform one-time password cross-referencing at a device whose processing capacity as hardware is limited due to problems such as cost.

For example, there is considered a configuration that the one-time password authentication technology is used for the management of the in-vehicle ECU (Electronic Control Unit) mounted on each individual automobile, and the in-vehicle ECU executes the one-time password cross-referencing. There has been disclosed in Patent Literature 2, a system which performs cross-referencing of a one-time password with an in-vehicle ECU which is an object to be accessed by a user who is a subject.

FIG. 3 is a conceptual diagram of a system which executes one-time password cross-referencing on the target side accessed by the subject. In the system of FIG. 3, an OTP 311 issued by a user authentication & OTP issuing server 300 is disclosed to a locking device 303 as an OTP 312 via a user 302, and the locking device 303 executes cross-referencing processing of the one-time password.

In the system of FIG. 3, an OTP cross-referencing chip 400 having a function corresponding to the hardware token of FIG. 1 is mounted inside the locking device 303, and is used for the cross-referencing processing of the one-time password in the locking device 303.

A clock 304 inside the OTP cross-referencing chip 400 is synchronized with a clock 301 inside the user authentication & OTP issuing server 300. Further, there are a plurality of the looking devices 303, and a passphrase 310 being a common key for each is stored inside the OTP cross-referencing chip 400 in a configuration in which tamper resistance is guaranteed. In addition, in the user authentication & OTP issuing server 300, the same passphrase 310 as that stored in the OTP cross-referencing chip 400 is managed in association with each locking device 303.

Accordingly, if the locking device 303 is specified, the user authentication & OTP issuing server 300 is capable of easily issuing the one-time password 311 corresponding to the locking device 303. Further, the OTP cross-referencing chip 400 mounted in the locking device 303 has a function of checking whether or not the one-time password 312 disclosed via the user 302 is legitimately issued for oneself.

The user 302 can acquire the one-time password 311 through user authentication 313 by the user authentication & OTP issuing server 300. For example, ID and password-based authentication or biometric authentication is performed. This eliminates malicious third parties from being involved in the issuance of the one-time passwords 311 and 312. Further, the issued one-time passwords 311 and 312 are invalidated after a predetermined time has elapsed. Consequently, the one-time password authentication by the present system exhibits strong resistance to replay attacks by malicious third party eavesdropping.

Thus, according to the systems of Patent Literature 2 and FIG. 3, it is possible to utilize one-time password authentication for the management of the in-vehicle ECU.

However, Patent Literature 2 does not disclose a suitable configuration of the OTP cross-referencing chip and the principle of its operation, and it is required to realize a configuration and operation suitable for the OTP cross-referencing chip.

In the system of FIG. 3, the OTP cross-referencing chip 400 is stored inside the locking device 303. It is not always possible to maintain an environment in which the standard radio wave can be received. Therefore, in order to provide time information to the OTP cross-referencing chip 400, the locking device 303 cannot be provided with a receiver for receiving the standard radio wave. Therefore, it is conceivable to provide the locking device 303 with an internal clock which autonomously keeps time. For example, it is conceivable that the time can be set from the parent chip, and after the time is set, an internal clock which autonomously keeps time is stored in the OTP cross-referencing chip 400. In that case, security considerations to prevent replay attacks are required when realizing the function of setting the time from the parent chip.

Further, in the use case of the online banking such as shown in FIG. 1, the flow of the information of the one-time password was in the direction from the small device (hardware token) to the server (online banking server). However, in the system of FIG. 3, the flow of the information of the one-time password becomes the opposite direction from the server (user authentication & OTP issuing server) to the small device (OTP cross-referencing chip).

Accordingly, in order to allow a certain amount of time deviation between the clock of the server and the clock inside the OTP cross-referencing chip and synchronize the time between the server and the device by such a method as disclosed in Non-Patent Literature 1, the processing of preparing a plurality of one-time passwords and updating the clock time according to the time deviation of the matched one-time password is performed on the OTP cross-referencing chip side.

However, it is also assumed that the OTP cross-referencing chip is computationally powerless in order to keep the cost low. Therefore, in the technique of Non-Patent Literature 1, it is difficult for the OTP cross-referencing chip to generate a plurality of one-time passwords on demand, as has been performed by the server. Assuming that the technique is adopted for the OTP cross-referencing chip, there is a possibility that situations can occur in which it takes a long time to generate the password sequence depending on the computing power of the chip, and the password will be changed by the time the password sequence is generated.

One object of the present disclosure is to provide a technique of realizing one-time password cross-referencing with a device having low computing power, that is, at low cost.

Solution to Problem

A cross-referencing device according to one aspect of the present disclosure includes a clock unit which keeps time by a built-in clock, and an authentication calculation unit which includes a first storage area capable of continuously storing (N+1) numerical values from a last written numerical value to a numerical value written N (N being a natural number) before and which generates a time-synchronized first cross-referencing one-time password at a time point having a predetermined time relationship with the current time at a predetermined first time interval on the basis of the time indicated by the clock, writes the same in the first storage area, and determines that authentication is successful where an authentication target one-time password received in a first authentication request matches with any of the (N+1) first cross-referencing one-time passwords in the first storage area.

Advantageous Effects of Invention

According to one aspect of the present disclosure, it is possible to realize authentication that allows the clock to shift within a certain period of time while reducing a processing load for generating a cross-referencing one-time password, and to realize one-time password cross-referencing at low cost.

DESCRIPTION OF EMBODIMENTS

Figure 1:
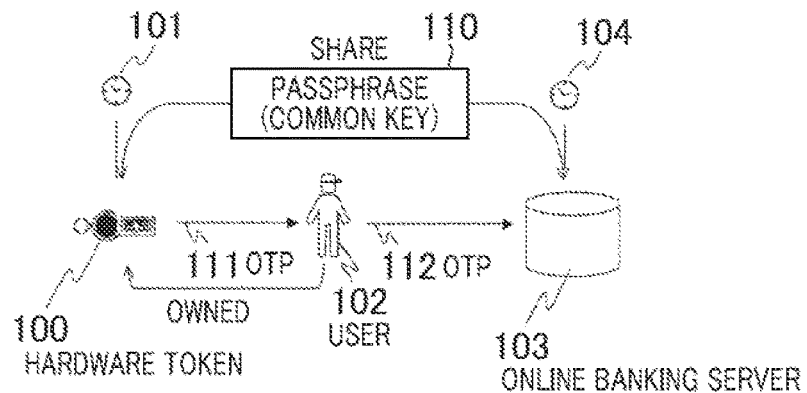
FIG. 1 is a conceptual diagram showing a procedure for user authentication in online banking using a hardware token.

Hereinafter, embodiments of the present invention will be described with reference to the drawings. The embodiments described below do not limit the invention according to the claims, and all of various elements and combinations thereof described in the embodiments are not always essential for the solving means of the invention.

Note that in the drawings for describing the embodiments, the same reference numerals are given to parts having the same function, and their repeated description will be omitted.

Further, in the following description, as an example of information, expressions related to information storage areas such as "xxx register" and "xxx memory" may be used, but attributes related to the characteristics of the storage area, that is, attributes such as a location designation method, superiority or inferiority related to the access speed, volatile or non-volatile for power supply operation or refresh operation, or read/write or read-only are not classified by the wording. In addition, the data structure of the information may be anything. That is, in order to show that the information does not depend on the structure of the storage area, "xxx register contents" can be referred to as "xxx memory contents". Further, the "xxx memory contents" may be simply referred to as "contents of xxx". Then, in the following description, the configuration of each information is an example, and the information may be divided and held, or may be combined and held.

Figure 4:
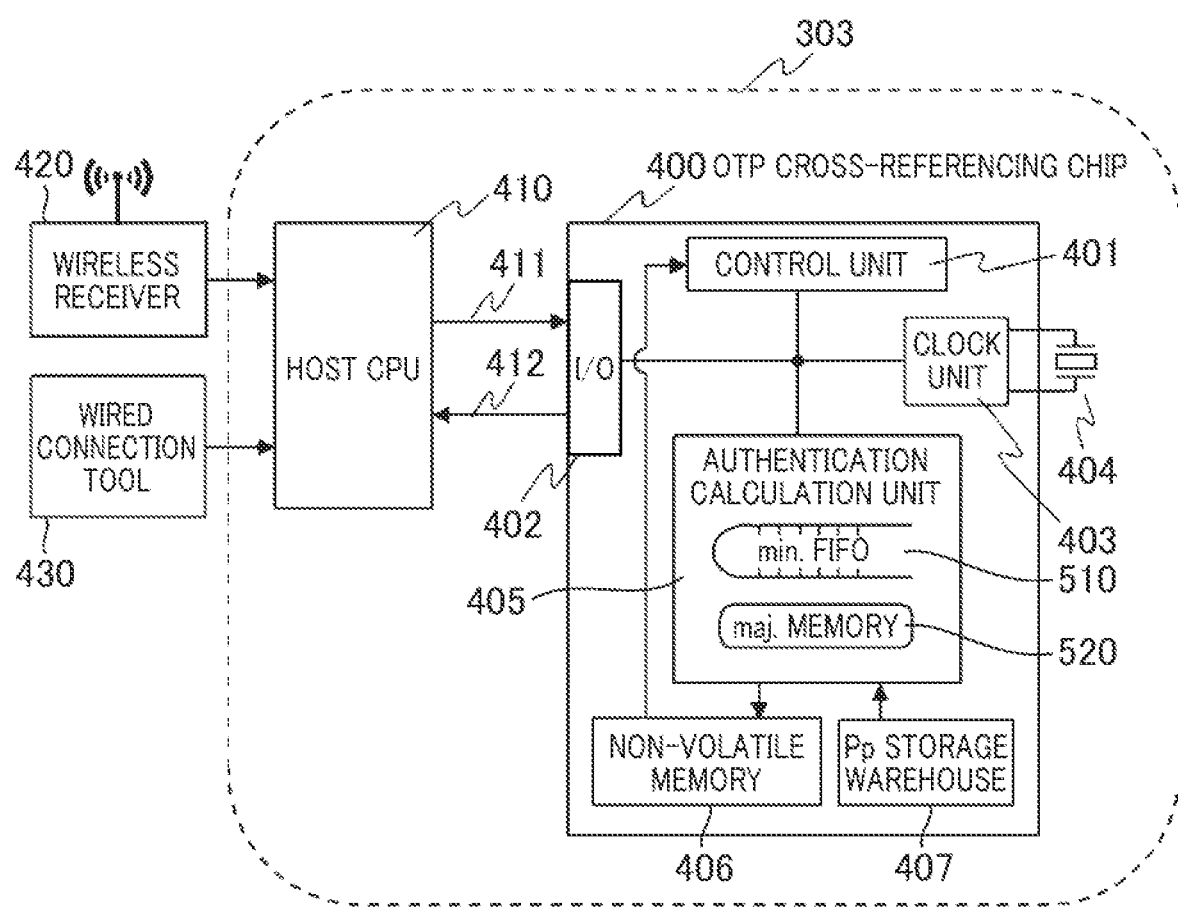
FIG. 4 is a block diagram showing the configuration of a cross-referencing device of the present embodiment.

FIG. 4 is a block diagram showing the configuration of a cross-referencing device of the present embodiment.

In the present embodiment, as shown in FIG. 4, the inside of a locking device 303 is comprised of a host CPU 410 and an OTP cross-referencing chip 400 connected to the host CPU by a signal.

Conventionally, operations related to security have been concentrated on a chip separate from a main body chip. This is to prevent information leakage of such as a secret key (information referred to by public key cryptosystem) to be concealed or a common key (information referred to by common key cryptosystem) stored in the security chip.

By consolidating the operations related to the security on the chip separate from the main body chip, it is possible to make memory space completely unobservable from the main body chip, and it is possible to prevent leakage of confidential information. Further, even from the viewpoint of tamper resistance, it is possible to adopt a silicon process (floating capacitance) or the like in which information is erased by so-called sealing and opening a resin-molded chip only for the security chip.

Figure 3:
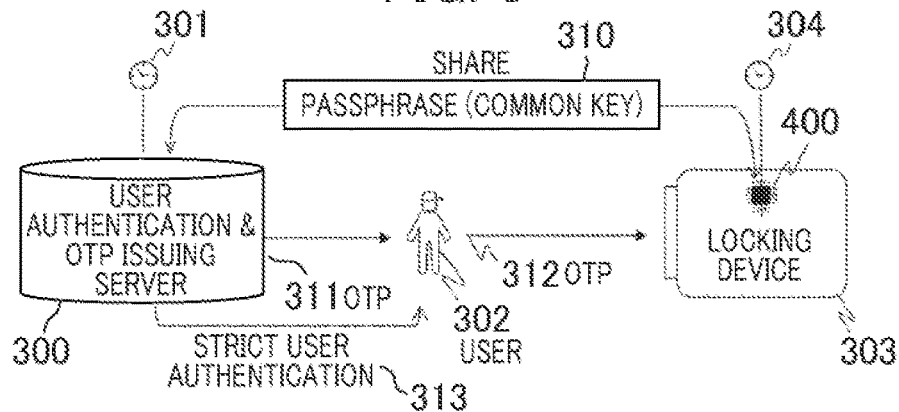
FIG. 3 is a conceptual diagram of a system which executes the collation of a one-time password on the object side that a subject accesses.

The reason why the host CPU 410 and the OTP cross-referencing chip 400 are separated from each other is that, as described above, the OTP cross-referencing chip 400 secures itself the tamper resistance, and the information of the common key and secret key (here, a passphrase 310 that shares knowledge with a user authentication & OTP issuing server 300 of FIG. 3) hidden and protected inside the OTP cross-referencing chip 400 through the host CPU 410 is prevented from being read.

As an activity to connect to the locking device 303 from the outside, the following forms can be considered as shown in FIG. 4. One of them is a wireless connection via a wireless receiver 420, and the other is a wired connection by a wired connection tool 430 or the like. When these activities and the locking device 303 cooperate with each other, an authentication operation as to whether or not the corresponding activity has a legitimate qualification must be done.

This authentication operation is performed using the above-described one-time password (OTP312 in FIG. 3), and the subject that verifies it is the OTP cross-referencing chip 400.

The one-time password is sent to the OTP cross-referencing chip 400 by a communication line 411 via the host CPU 410. The verification result is sent back from the OTP cross-referencing chip 400 to the host CPU 410 through a communication line 412, and then the host CPU 410 determines the next behavior to be taken based on this result.

As the details of data on the communication line which connects the host CPU 410 and the OTP cross-referencing chip 400, the communication line 411 is a command given to the OTP cross-referencing chip from the host CPU, time adjustment data of a clock to be described later in the OPP cross-referencing chip, or OTP data to be authenticated from outside. Further, the communication line 412 is an authentication result sent back from the OTP cross-referencing chip to the host CPU, or various status report values.

These communication paths 411 and 412 may be those on which serial transmission is performed, or those on which parallel transmission like a bus is performed. In addition, it may also be one like a network controlled by a high level of protocol other than serial/parallel. This is handled by an I/O unit 402 inside the OTP Cross-referencing chip 400.

The inside of the OTP cross-referencing chip 400 is comprised of a control unit 401, the above-described I/O unit 402, a clock unit 403, an authentication calculation unit 405, a non-volatile memory 406, and a passphrase storage warehouse 407.

The control unit 401 is a part which controls the operation of the entire OTP cross-referencing chip 400, and may be implemented by a PLC (Programmable Logic Controller), or may be implemented by software or firmware by a general CPU.

The clock unit 403 ticks the time by a built-in clock. Although the initial time value is initially set from the host CPU 410 via the communication path 411, the clock unit 403 has the built-in clock that autonomously ticks the time thereafter. Even if the power of the entire locking device 303 is turned off, a backup power supply is fed so that only the clock unit 403 continues to operate. Further, the connection with a crystal oscillator 404 for the clock is maintained externally.

When the backup power supply is cut off and the clock stops, or when the clock is initialized by the reset operation of the chip, the status to that effect is reported to the host CPU 410 through the above-described communication path 412.

The authentication calculation unit 405 has thereinside a storage area for holding a comparison reference value for one-time password authentication. This storage area is a minor password FIFO 510 being a first storage area and a major password memory 520 being a second storage area, which will be described later, and these information cannot be read from the outside of the OTP cross-referencing chip 400. On the basis of these values, the password sent from the outside is collated to determine whether the authentication is OK/NG.

The non-volatile memory 406 is used to store the latest time when authentication is successful and to prevent a replay attack due to a time change to be described later. This stored content is not erased even if all the power supplies including the above-mentioned clock backup power supply are turned off or the chip reset operation is executed. Only the value from the authentication calculation unit 405 can be overwritten.

The passphrase storage warehouse (common key storage unit) 407 is a part which stores the passphrase 310 serving as a common key that shares knowledge with the server, and which has a high degree of tamper resistance being secured, and also protects against destructive reading of the content from the outside of the chip. Of course, the host CPU 410 cannot read this content.

Figure 5:
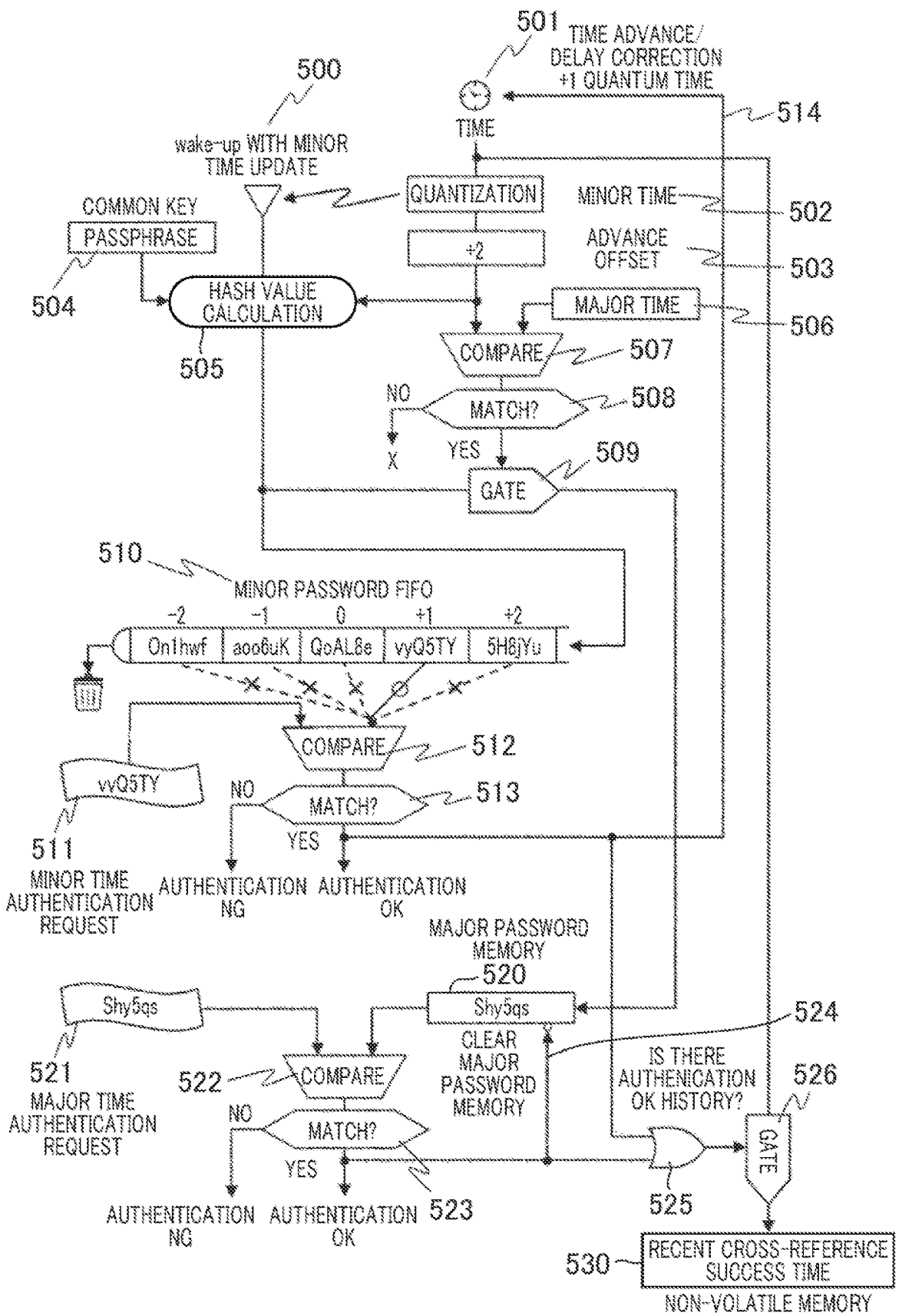
FIG. 5 is a data flow diagram inside an OTP cross-referencing chip shown in FIG. 4.

FIG. 5 is a data flow diagram inside the OTP cross-referencing chip 400 shown in FIG. 4, and shows an outline of a password cross-referencing operation.

The clock 501 is a clock stored in the clock unit 403 shown in FIG. 4, and its contents must strictly match in format with the clock on the user authentication & OTP issuing server 300 side. The format is arbitrary regardless of any time format used such as Japan Standard Time JST, Coordinated Universal Time UTC, GPS (Global Positioning System) time, UNIX time (UNIX is a Registered Trademark) as long as they match.

In processing 502, the contents of the clock are quantized. Quantization is to divide the contents of the clock by a time interval at which the one-time password is switched, round down the remainder, and convert it into a natural number. Assuming that this switching time interval is, for example, [minutes], it corresponds to dividing the seconds representation of the clock 501 by 60 and rounding down the remainder. The time after this quantization is referred to as a minor time here. That is, the minor time is the time when the value of the one-time password is switched.

When the current minor time is increased by 1 compared to the previous minor time, a series of sequences starting from processing 500 are started.

In processing 503, an advance offset (+2 here) is added to the minor time and combined with a passphrase 504 stored in the passphrase storage warehouse 407, and a hash value is calculated in processing 505. This becomes a one-time password at an offset advanced time from the current minor time.

The hash value is calculated by calling a hash function (not shown) stored in the authentication calculation unit 405. Here, the hash function (described as hash ( ) below as a mathematical function) is a cryptographic function having the following properties of (1) to (3), which compresses data of an arbitrary length into data of a fixed length (about 128 to 512 bits).

(1) One-way: It is difficult to find an input value from an output value. That is, when a certain hash valve h is given, it must be difficult to find an arbitrary m that satisfies h=hash (m).

(2) Difficulty in calculating a second original image: It is difficult to obtain another input having the same hash value as a certain input value. That is, when m is given, it must be difficult to find m' (where m≠m') such that hash (m)=hash (m').

(3) Collision difficulty: It is difficult to find two input values which generate the same output value. That is, it must be difficult to obtain m and m' which satisfy hash (m)=hash (m') (where m #m').

That is, the hash is a cryptographic function which enables the output to be easily calculated if given the input, with certain reproducibility, but is hard to calculate the input back from the output (it takes a lot of time and cost).

Thus, even if the one-time password flowing between the external activity and the locking device 303 is eavesdropped and recorded, it is difficult to infer the passphrase 504 from this information.

The one-time password calculated in the processing 505 is pushed into the minor password FIFO 510 from the right side as a first cross-referencing one-time password. At this time, the leftmost valve which is the oldest one-time password is pushed out from the FIFO and discarded.

The structure of the minor password FIFO is comprised of a total of 5 points of from a lag −2 to a median 0 and advance +2, in minor time increments from the left. That is, it has an authentication allowable range which enables password authentication by absorbing a synchronous difference in time between the server and the OTP cross-referencing chip, and a difference of the total of 5 points [minor time].

Here, in FIG. 5, the value of each password is represented by 6 digits of 62-ary numbers (base numbers represented by character types 0 to 9, A to Z, and a to z). This is equivalent to about 36 bits in binary number conversion and is smaller than the output value of the hash function described above (fixed length of about 128 to 512 bits). This serves as a password configured by partial values (subsets) of the hash function output, and is determined by the balance between the probability that the same password will be generated in a fixed period (risk of being broken) and the ease of memory and cross-referencing processing. If the permissible risk is evaluated, the size of the password can be arbitrarily determined in terms of implementation.

Looking back at the above data flow, since the hash function is just activated only once at the update timing of the minor time, it can be executed even with a chip with weak computing power, and the cost of the OTP cross-referencing chip itself can be kept low.

Further, the OTP cross-referencing chip 400 calculates the one-time password at the most advanced time (that is, the rightmost end of the minor password FIFO 510) within the authentication allowable range when updating the minor time. This brings about an effect that even if the maintenance of the minor password FIFO is interrupted in authentication request processing described later, the generation of the rightmost end of the authentication allowable range is only delayed, so that the risk of an authentication failure due to the processing delay of the OTP cross-referencing chip 400 can be minimized.

Here, when a minor time authentication request 511 being a first authentication request comes, a comparator 512 performs searching for whether or not the password (authentication target one-time password) included in the minor time authentication request 511 exists in the minor password FIFO 510. If there is a match in the search result, the authentication is OK in determination processing 513. If there is no match therein, the authentication is NG.

Thus, the OTP cross-referencing chip 400 has the clock unit 403 that keeps time by the built-in clock and the authentication calculation unit 405. The authentication calculation unit 405 has the minor password FIFO 510 capable of storing (N+1) numerical values from the last written one to the one written N (N: Natural number) before. The authentication calculation unit 405 generates a time-synchronized first cross-referencing one-time password about the time point having a predetermined time relationship with the current time at a time interval according to the minor time, which becomes a predetermined first time interval on the basis of the time indicated by the clock, writes it to the minor password FIFO 510, and determines that the authentication is successful where the authentication target one-time password received in the first authentication request matches with any of the (N+1) first cross-referencing one-time passwords of the minor password FIFO 510. (N+1) first cross-referencing one-time passwords generated at different timings are saved one by one and collated with the authentication target one-time password, thereby making it possible to realize authentication that allows the clock to shift within a fixed time while reducing a processing load for generating the cross-referencing one time password, and to realize one-time password cross-referencing at low cost.

When the password included in the minor time authentication request 511 exists in the minor password FIFO 510, it is possible to know how far the clock on the server side is advanced (or delayed) from its matching offset with respect to the clock of the OTP cross-referencing chip 400 with the minor time width (quantum time) as a unit. Therefore, this is fed back to the clock 501 to perform time correction processing 514 of the clock 501. That is, the authentication calculation unit 405 corrects the time of the clock, based on the time corresponding to the cross-referencing one-time password that matches the authentication target one-time password. Thus, by correcting the time of the clock on the basis of the time corresponding to the cross-referencing one-time password that matches the authentication target one-time password, it is possible to suppress the out-of-sync of the time with the device having generated the authentication target one-time password by the accuracy of the clock.

Since the password matches with the offset +1 in the minor password FIFO 510 when the content of the time correction processing 514 is shown in the example of FIG. 5, the clock inside the server is advanced by a +1 minor time width (quantum time) compared to the content of the clock 501. Therefore, the clock 501 is advanced by the +1 minor time width (quantum time) and synchronized with the clock inside the server.

When the authentication is made successful, the time 501 at that time (accurately, the time after the time correction processing 514) is stored in a "recent cross-reference success time" register 530 via a signal gate 526 driven by an OR gate 525. The "recent cross-reference success time" register 530 is in the non-volatile memory, and its value is retained even if the power is cut off or the OTP cross-referencing chip itself is in a reset state. Further, the contents of this register are set to the oldest numerical value represented by the clock 501 at the time of the first initialization, and are updated to a future value every time the authentication is made successful.

The contents of this register (and the accompanying capture operation and reference operation) will be described later.

In comparison processing 507, it is compared whether the minor time (output in the processing 503) with the advance offset addition matches a major time 506.

The major time is a password update cycle rougher in increment than the minor time. That is, the time interval of the major time (second time interval) is larger than the time interval of the minor time (first time interval). For example, the minor time may be engraved in [minute] units, and the major time may be in [day] units. At this time, the major time 506 becomes a time obtained by adding 24*60=1440 minor time increments to the previous major time.

When it is determined to match in determination processing 508, the hash function output 505 at that time is stored in the major password memory 520 as a one-time password of a [day] cycle via a signal gate 509.

Here, when a major time authentication request 521 being a second authentication request comes, a comparator 522 performs a comparison whether password included in the major time authentication request 521 matches the contents of the major password memory 520. If there is a match therein, the authentication becomes OK in determination processing 523. If there is no match, the authentication is NG.

If the authentication is OK, the major password memory 520 is cleared by a feedback signal 524. Therefore, major authentication is prohibited until the next major time cycle arrives and the contents of the major password memory 520 are updated.

When the major time authentication is made successful, the time 501 at that time is stored in the "recent cross-reference success time" register 530 via the signal gate 526 driven by the OR gate 525 as in the minor time authentication. The existence of this register in the non-volatile memory and reference thereto in processing described later are the same as the major time authentication.

The major time authentication corresponds to forced unlocking processing when the minor time authentication fails many times due to a time shift. When the time shift becomes severe in hardware token in online banking as shown in FIG. 1, the current token can be returned to the server-side organization and reissued. However, since such a remedy cannot be taken in the OTP cross-referencing chip 400 for device-embedded applications, it serves as an emergency measure in that case. Since the effect is great, in order to avoid a brute force attack as described below, it is necessary to set a certain degree of code of usage in connection with a failure history of minor time authentication in terms of security.

Figure 6:
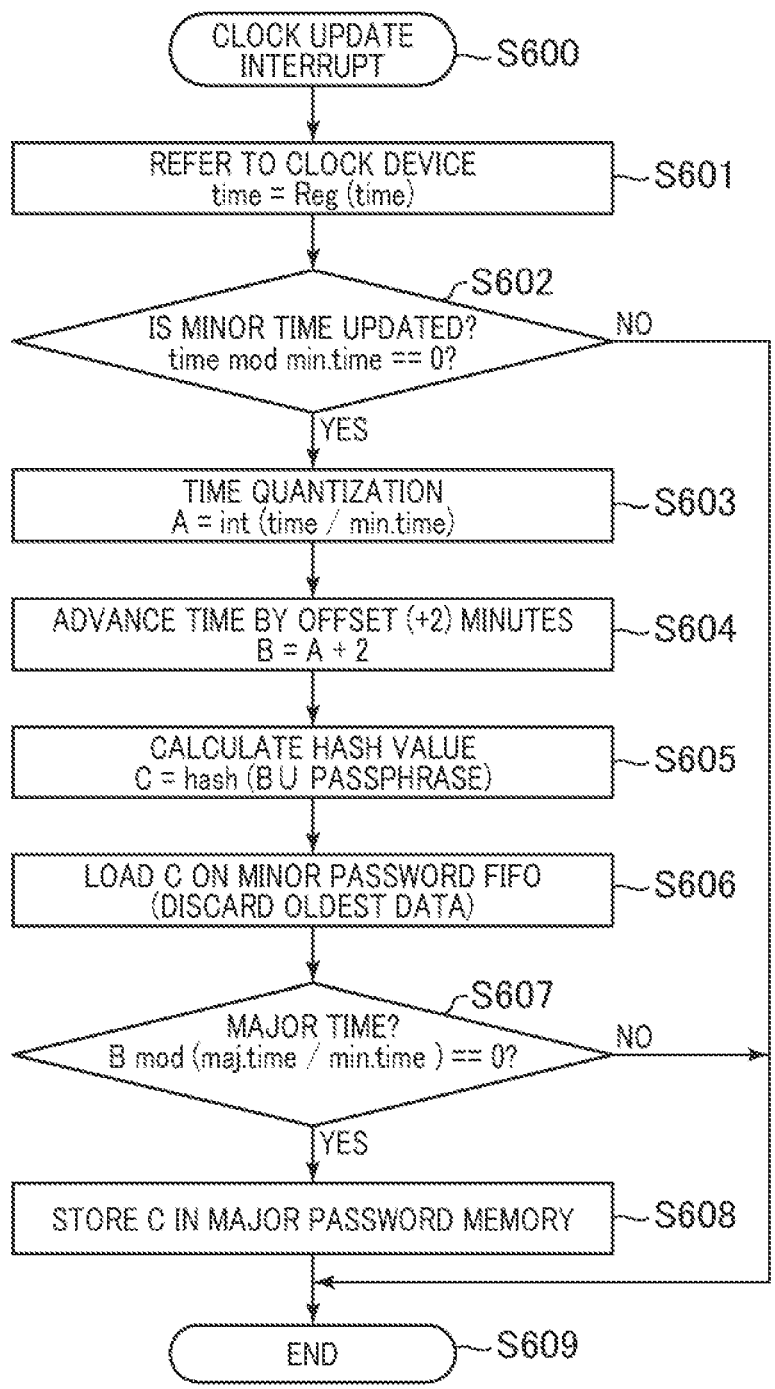
FIG. 6 is a flowchart showing processing of generating a cross-referencing minor password and a major password in the OTP cross-referencing chip shown in FIG. 4.
Figure 7:
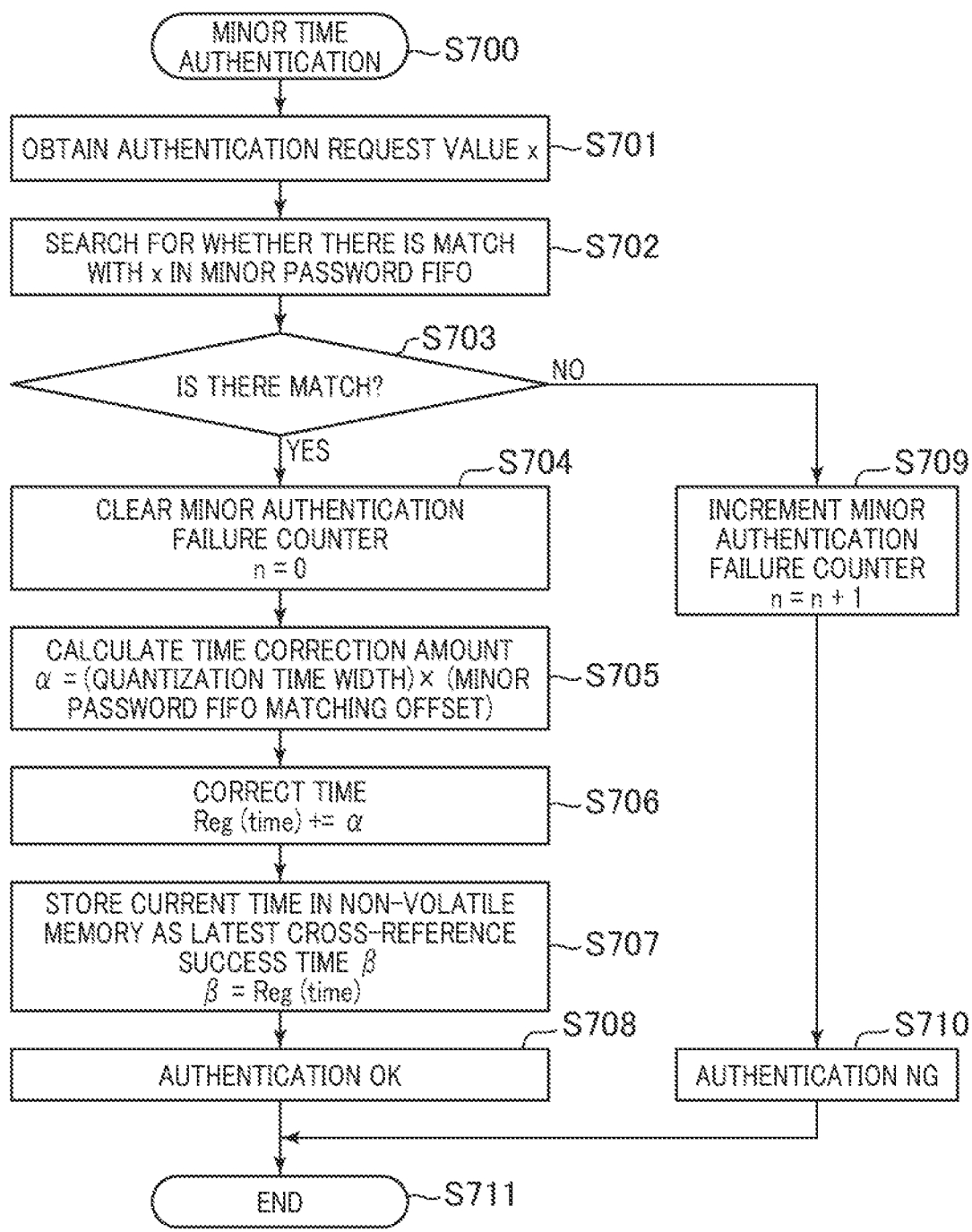
FIG. 7 is a flowchart showing processing of minor time authentication in the OTP cross-referencing chip shown in FIG. 4.
Figure 8:
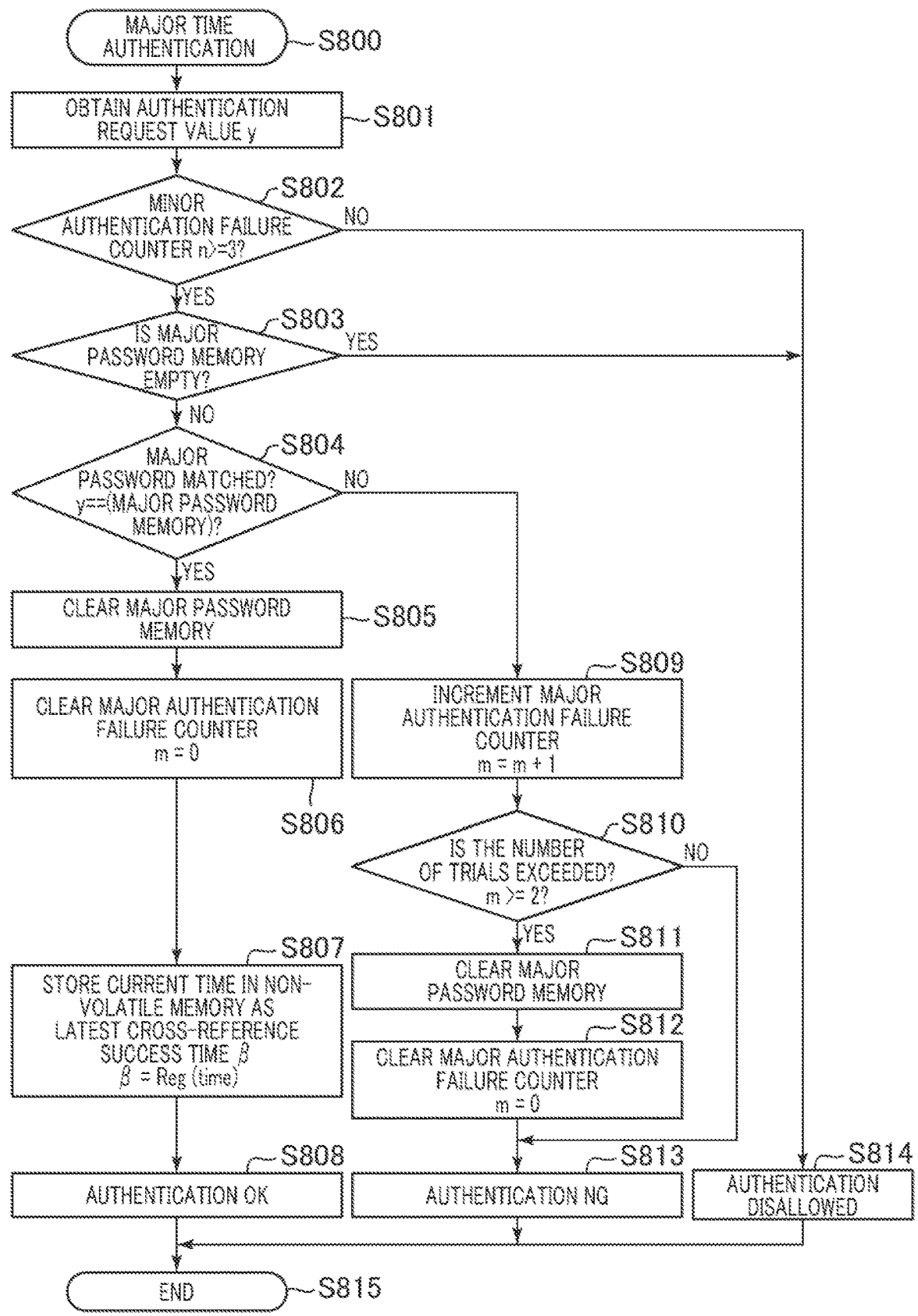
FIG. 8 is a flowchart showing processing of major time authentication in the OTP cross-referencing chip shown in FIG. 4.

An example in which the operations described using FIG. 5 are collectively realized by software is shown in the flowcharts of FIGS. 6 to 8.

FIG. 6 is a flowchart showing processing of generating a cross-referencing minor password and a major password in the OTP cross-referencing chip 400 shown in FIG. 4. The present processing is executed by the authentication calculation unit 405 according to the instruction of the control unit 401.

Step S600 is started by a clock update interrupt of the clock 501. It is assumed that the clock update interrupt is activated at the minor time interval itself or at an interval of 1/integer thereof.

In Step 601, a predetermined register of a clock device is read, and an expression value of the time is assigned to a variable time.

In determination Step S602, the variable time is divided by an internal representation value min. time of the minor time interval to obtain the remainder. If the remainder is zero, it means that the minor time has arrived, and hence the processing proceeds to Step S603. On the other hand, if the remainder is other than zero, the minor time has not yet arrived. Therefore, the processing proceeds to Step S609, and the processing is promptly ended.

The determination in Step S602 plays the role of dividing the timing by the minor time interval when the clock update interrupt S600 arrives with a resolution of 1/integer of the minor time interval. Therefore, when the clock update interrupt S600 is originally set to arrive at the minor time interval itself, this determination is unnecessary.

In the next Step S603, the internal representation of the clock is converted to a value A in minor time units. Here, for example, the minor time is set to [minute]. In Step S604, an offset for advancing, here +2 is added to this minor time to obtain a value B.

In Step S605, this B and the passphrase 504 stored in the passphrase storage warehouse 407 are combined into an argument of the one-way hash function (hash ( )) to obtain a one-time password C for minor time+2 advances.

The expression format of the value B itself, a method of combining the value B and the passphrase (using "v" as a string combination operator, for example, distinctions such as left combination: Bυpassphrase, right combination: passphraseυB, internal insertion: passphrase part1∪B∪passphrase 2, etc.), and the type of unidirectional hash function (MD4, MD5, SHA, SHA-1, SHA-2, SHA-3, etc.) must be unified with the server side.

Further, in the one-time password C, as described above, the output of the one-way hash function (fixed length 128 to 512 bits) may be trimmed, and the value of the subset may be adopted as shown in FIG. 5. Although repeated, this is determined by the balance between attack resistance to passwords (related to risk), the amount of memory resources consumed (related to cost), and the rate of processing speed (related to cost and performance).

In the next Step S606, the one-time password C is loaded on the minor password FIFO. Consequently, the oldest data (the password value for the latest delay) is pushed out of the FIFO and discarded. In the example of FIG. 5, the latest password value is loaded on the minor password FIFO 510 from the right, and the leftmost old password is pushed out from the left and discarded.

In a determination Step S607, it is checked whether or not the minor time B being in processing has a remainder with respect to the ratio of the major time to the minor time (maj.time/min.time). If the remainder is zero, the major time has arrived, so that the processing proceeds to Step S608, where the one-time password C is also stored in the major password memory 520, and the series of processing is completed in Step S609. As the major time, for example, [day] is assumed as described above.

If the remainder exists, the major time has not yet arrived and hence the processing proceeds to Step S609 to end the processing.

Thus, the password time series value that had to be calculated at once on demand in online banking can be formed by accumulating only one password generation for each minor time in the OTP cross-referencing chip 400. Therefore, the processing performance of the OTP cross-referencing chip itself may be small, which contributes to a reduction in the cost of the chip.

Thus, the total number written to the minor password FIFO 501 is taken to be an odd number of N+1 (N is an even number). The authentication calculation unit 405 is configured to generate a cross-referencing one-time password at the time of advancing by N/2 in a predetermined time unit from the current time and write it to the minor password FIFO 501. Therefore, a deviation in any direction of the front and rear of the clock can also be tolerated.

Further, the authentication calculation unit 405 stores the common key used for generating the cross-referencing one-time password in the passphrase storage warehouse 407, and the authentication calculation unit 405, the control unit 401, the clock unit 403, and the passphrase storage warehouse 407 are integrally mounted as the OTP cross-referencing chip. Therefore, it is possible to reduce leakage of the information of the common key.

FIG. 7 is a flowchart showing the processing of minor time authentication in the OTP cross-referencing chip 400 shown in FIG. 4. The present processing is executed by the authentication calculation unit 405 according to the instruction of the control unit 401.

The present processing is started by the command instructed by the host CPU 410 through the communication line 411.

Since the minor password itself changes if there is a delay, the present Step S700 must be executed as soon as possible, That is, the priority of the present processing is higher than that of the clock update interrupt Step S600 of FIG. 6. Thus, during the execution of the present Step S700, the clock update interrupt is interrupted, but since the clock update interrupt is originally processing of calculating the password at the end of the minor password FIFO 510 large in time deviation, the risk given to the authentication calculation processing (the risk of authentication failure) is expected to be small.

In Step S701, an authentication request value x is obtained from the host CPU 410. In the following Step S702, a search for whether this x exists in the minor password FIFO is performed.

If there is a match in the determination Step S703, the processing proceeds to Step S704. If there is no match, a minor authentication failure counter n is incremented in Step S709, and the processing of Step S711 is terminated as authentication NG (Step S710). If there is a match, it means that the authentication has been performed, and hence the minor authentication failure counter is cleared in Step S704.

In the following Step S705, the matching offset of the minor password FIFO (element subscript of the minor password FIFO 510 in FIGS. 5: −2 to 0 to +2) is multiplied by a quantization time width (clock expression value of the minor time interval) so that a clock correction amount $\alpha$ is calculated. In the following Step S706, this correction amount $\alpha$ is added to the clock to correct it.

In Step S707, the clock value at this point (the value corrected in Step S706) is stored in the non-volatile memory as the latest cross-reference success time $\beta$. This corresponds to the "recent cross-reference success time" 530 in FIG. 5, and the storage area of 530 exists in the non-volatile memory 406 of FIG. 4.

In the following Step S708, the authentication is OK and the processing is ended in Step S711.

When the minor time authentication in FIG. 7 fails frequently (when the minor authentication failure counter n increases monotonously), it is considered that the deviation between the clock 304 inside the OTP cross-referencing chip and the clock 301 inside the server becomes large. The means to remedy it is major time authentication shown below.

FIG. 8 is a flowchart showing the processing of the major time authentication in the OTP cross-referencing chip 400 shown in FIG. 4. The present processing is executed by the authentication calculation unit 405 according to the instruction of the control unit 401.

The present processing is also started by the command instructed by the host CPU 410 through the communication line 411.

In Step S801, an authentication request value y is obtained from the host CPU 410.

In Step S802, it is checked whether the minor authentication failure counter n is larger than a predetermined value (here, 3). Since it is not the stage of trying the major time authentication yet if it is less than the predetermined value, the authentication is disallowed in Step S814, and the processing is terminated in Step S815.

When minor authentication fails frequently above predetermined value, it is checked in Step S803 whether the major password memory (520 in FIG. 5) is empty.

The expression that the major password memory is empty has two meanings of (1) and (2) shown below. (1) means a state in which the major time has not passed even once since the OTP cross-referencing chip was activated, and the major password has not been generated. (2) means a state in which the major password was once generated, but the content is cleared in some circumstances as a result of the major time authentication, and the major authentication is not accepted until the major password is generated with the arrival of the next major time.

In Step S803, in either of the above states (1) and (2), since there is no qualification to try the major time authentication, the processing proceeds to Step S814 where the authentication is taken as non-permission, and the processing is ended in Step S815.

If the minor authentication fails a predetermined number of times or more, and the major password memory is not empty, the processing proceeds to determination Step S804 to check whether the obtained value y and the contents of the major password memory match.

If the obtained value y and the contents of the major password memory do not match, the authentication has failed, and hence the processing proceeds to Step S809 to increment the major authentication failure counter m.

In the next determination Step S810, it is checked whether or not the number of major authentication failures is a predetermined number of times (2 here) or more. If it is less than the predetermined value, the processing proceeds to Step S813 where the authentication is taken as NG, and the processing is terminated in Step S815.

If the major authentication failure counter m is equal to or greater than a predetermined valve, there is a possibility of a brute force attack being received. Therefore, the contents of the major password memory are cleared in Step S811 (in the above-described determination Step S803, there is an effect of rejecting major authentication until the next major password generation timing arrives).

In the following Step S812, the major authentication failure counter m is cleared in order to prevent the number of failures from accumulating, the processing proceeds to Step S813 where the authentication taken as NG, and the processing is ended in Step S815.

If the obtained value y and the contents of the major password memory match in the determination Step S804, the major password memory is cleared in Step 805 (also in the above-described determination Step S803, there is an effect of rejecting the major authentication until the next major password generation timing arrives). This is to eliminate the possibility that the major password at this time (when the major time authentication is OK) is eavesdropped by a malicious third party, and a playback attack is performed until the next major time arrives (the major password is changed).

In the next Step S806, since the authentication is made successful, the major authentication failure counter m is cleared, and in Step S807, the clock value at this point is stored in the non-volatile memory as the latest cross-reference success time $\beta$ as in Step S707 of FIG. 7. This corresponds to the "recent cross-reference success time" 530 in FIG. 5, and the storage area of 530 exists in the non-volatile memory 406 of FIG. 4 as in FIG. 7.

In the following Step S808, the authentication is taken as OK, and the processing is ended in Step 815.

Thus, in the present embodiment, the operation of the OTP cross-referencing chip can be translated and implemented as a series of software processing.

As described above, when the time point corresponding to the first cross-referencing one-time password written in the minor password FIFO 510 coincides with the current time ticked at the time interval according to the major time, which is longer than the time interval according to the minor time, the authentication calculation unit 405 writes the first cross-referencing one-time password into the major password memory 520 as the second cross-referencing one-time password. Therefore, the second cross-referencing one-time password is invariant during a relatively long period called the major time. Then, when the authentication target one-time password received in the second authentication request matches the second cross-referencing one-time password written in the major password memory 520, it is determined that the authentication is successful, so that relief is possible when time of the clock is significantly deviated.

Also, when the authentication calculation unit 405 determines that the authentication target one-time password included in the authentication request matches the second cross-referencing one-time password written in the major password memory 520 and that the authentication is successful, the second cross-referencing one-time password written in the major password memory 520 is cleared and then authentication by the second authentication request is prohibited until the second cross-referencing one-time password is updated, whereby authentication for the relief when the clock time is significantly deviated is prohibited after the authentication is successful, and the security during the relatively long second time interval can be improved.

Further, the authentication calculation unit 405 counts the number of authentication failures in the first authentication request. When the number of times of failures reaches a predetermined number of times, the authentication calculation unit 405 permits the authentication of the second authentication request, whereby the authentication of the second authentication request is taken as a remedy when the authentication failure of the first authentication request is repeated, and in that case is permitted, thus making it possible to realize the remedy in consideration of security. That is, by concealing the number of times of failures of the first authentication leading to the second authentication from the outside and providing a delay time from the first authentication to the second authentication permission (not shown), it is possible to detect that the first authentication has failed more than necessary and that the brute force attack has been received from the outside.

In addition, the authentication calculation unit 405 counts the number of times of authentication failures in the second authentication request. When the number of times of the failures reaches a predetermined number of times, the authentication by the second authentication request until the second cross-referencing one-time password written in the major password memory 520 is updated next is prohibited. Thus, the second authentication request is prohibited when the authentication failure of the second authentication request is repeated, and the security of the second authentication request can be improved. This also becomes a brute force attack detection function.

The hardware token used for online banking is distributed to users by adjusting the time on the issuer side, but since a standard radio wave receiver is not mounted in the OTP cross-referencing chip 400, the initial time adjustment must be done with the help of the host CPU 410.

Figure 9:
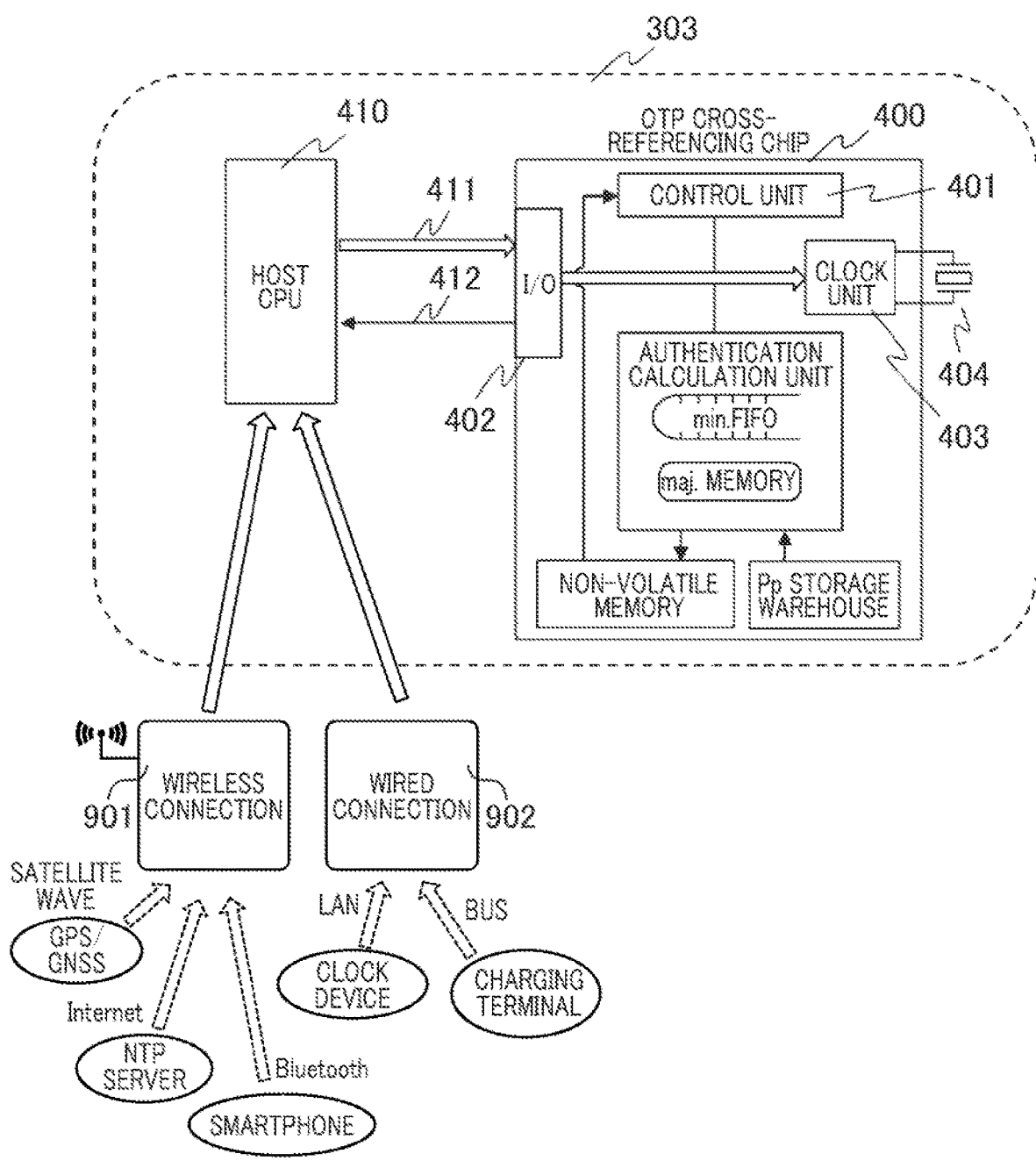
FIG. 9 is a diagram conceptually showing time adjustment in the OTP cross-referencing chip shown in FIG. 4.

FIG. 9 is a diagram conceptually showing the time adjustment in the OTP cross-referencing chip 400 shown in FIG. 4.

For the host CPU 410, various sources to obtain time information can be assumed according to the field of application of the locking device 303.

For example, in the case of a time source 901 with wireless connection, time reception of GPS/GNSS (Global Positioning System/Global Navigation Satellite System) by satellite waves, connection with an NTP (Network Time Protocol) server via Internet, connection with a user's smartphone by Bluetooth (Bluetooth: Registered Trademark), etc. are conceivable. Separately from the above, in the case of a time source 902 with wired connection, various means are conceivable such as reception of user's time adjustment information from the clock device in the same system via LAN (Local Area Network), reception of information from a charging terminal via a charging cable in the case of an in-vehicle device in an EV (Electric Vehicle) car, etc.

The host CPU 410 must obtain the current time from these time sources (901, 902) at the time of initial operation (at the time of initialization of system burning, or when the system is restarted after being stopped due to power off, or when the system is reset and restarted for some reason).

After that, it is necessary to synchronize the time of the clock unit 403 with the server time by issuing a time adjustment command to the OIP cross-referencing chip 400 via the communication path 411.

From this, the OTP cross-referencing chip has more increased in degree of freedom for time adjustment than the hardware token that could be time adjusted only by the issuer shown in FIG. 1. Therefore, there is increasing room for security risks to pierce that part, and countermeasures against it are necessary.

Figure 10:
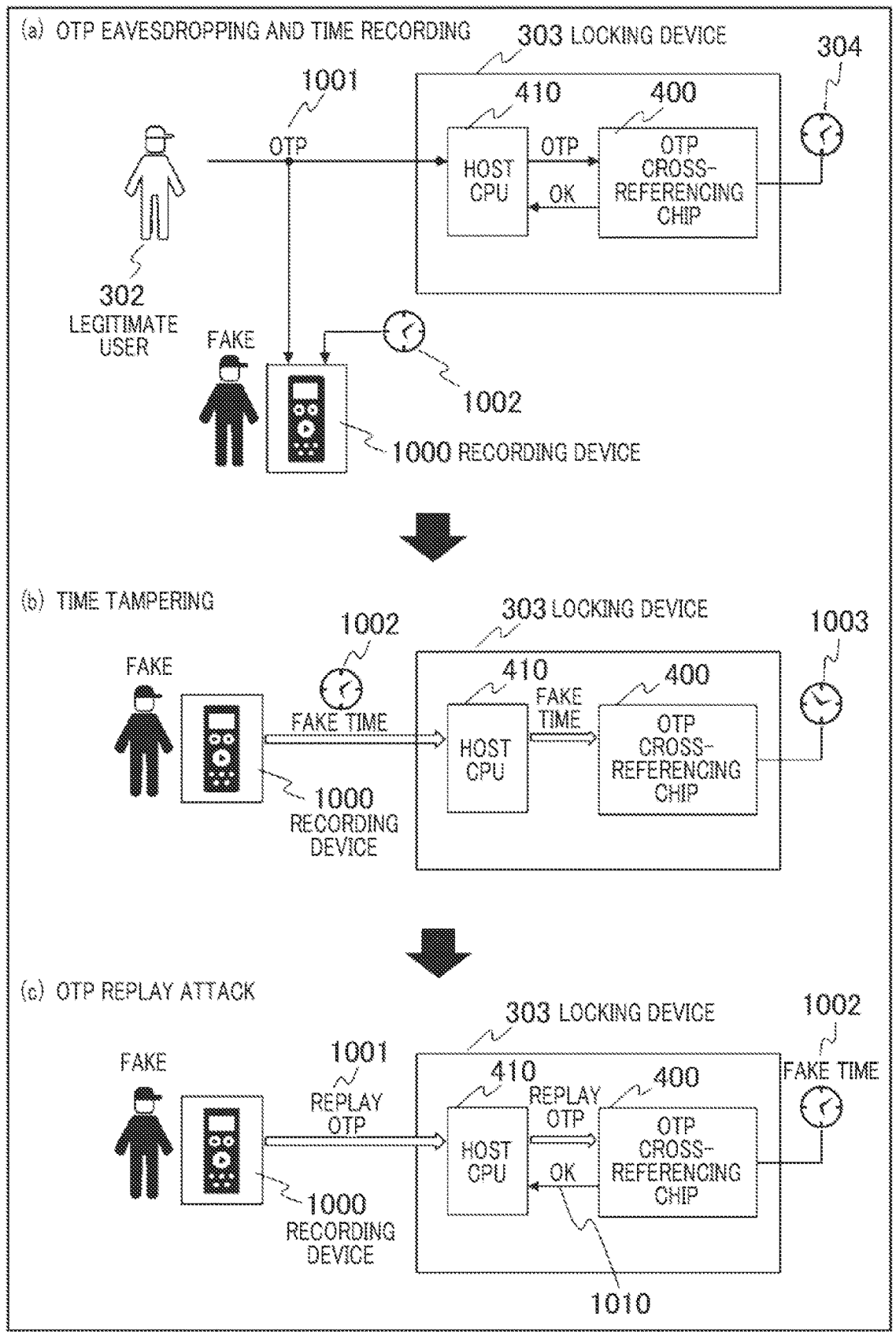
FIG. 10 is an explanatory diagram showing the flow of a replay attack in the OTP cross-referencing chip 400 shown in FIG. 4.

FIG. 10 is an explanatory diagram showing the flow of a replay attack which takes the risk of this time adjustment in the OTP cross-referencing chip 400 shown in FIG. 4.

In FIG. 10(a), a "fake and recording device" 1000 monitors the communication of a legitimate user 302 with the locking device 303 from the side and records information of a one-time password 1001 and time information 1002 at that time. The time information 1002 is assumed to be equal to the clock information 304 inside the OTP cross-referencing chip 400.

In FIG. 10(b), the "fake and recording device" 1000 attempts to unlock the locking device 303 illegally. At the time of connection of the "fake and recording device" 1000, the internal clock of the OTP cross-referencing chip 400 is updated to 1003. Consequently, the "fake and recording device" 1000 brings the locking device 303 into a state in which the clock must be initialized by turning off the power of the locking device 303 or injecting a reset operation.

When the locking device 303 requests external clock information, the "fake and recording device" 1000 gives the locking device the fake time information 1002 recorded in FIG. 10(a), and attempts to tamper with the clock time of the OTP cross-referencing chip 400.

In FIG. 10(c), it is assumed that the clock of the OTP cross-referencing chip has been tampered with 1002 as described above. At this time, the "fake and recording device" 1000 reproduces the one-time password 1001 recorded in FIG. 10(a). Since the combination of the one-time password and the clock information is the same as in FIG. 10(a), the OTP cross-referencing chip is deceived and returns an authentication OK signal 1010 to the host CPU.

This is a replay attack that rewinds the time and disguises it. Compared with the hardware token, the OTP cross-referencing chip must prevent such a time rewind attack.

Figure 11:
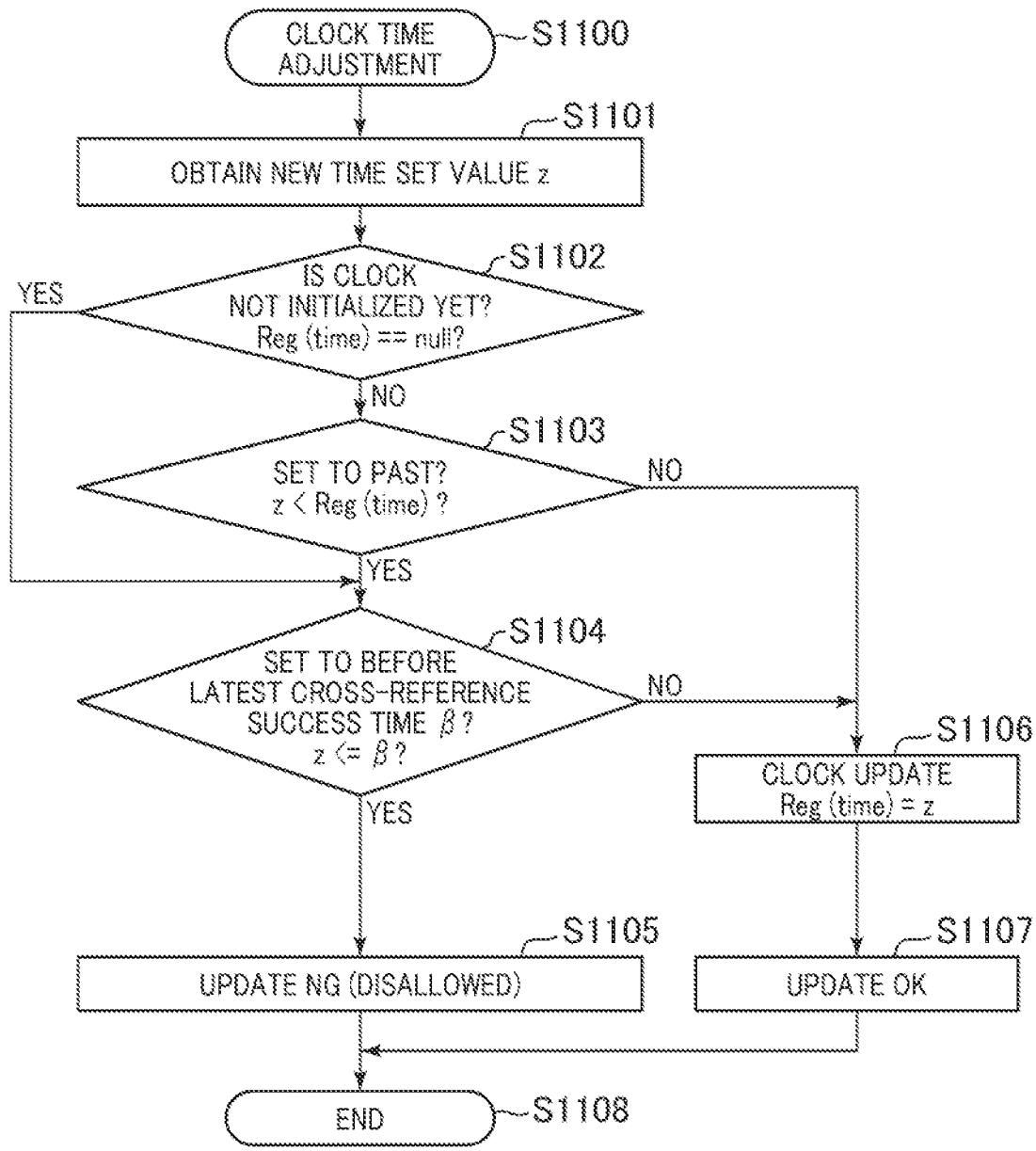
FIG. 11 is a flowchart showing time adjustment processing added with a restriction for countering the replay attack in the OTP cross-referencing chip 400 shown in FIG. 4.

FIG. 11 is a flowchart showing time adjustment processing in which a restriction for countering a replay attack in the OTP cross-referencing chip 400 shown in FIG. 4 is added. The present processing is executed by the control unit 401.

In FIG. 11, when the clock time adjustment operation occurs (i.e., when the host CPU 410 sends the time adjustment command) from the viewpoint seen from the OTP cross-referencing chip 400, Step S1100 is activated.

In Step S1101, the new time set value z sent by the host CPU 410 is obtained.

In the combination of a determination Step S1102 and a determination Step S1103, when the clock has not been initialized yet, or when the clock has already been initialized, and the time is changed retroactively from the current time, the processing proceeds to Step S1104.

When it is not the case, that is, when the clock has already been initialized, and the clock is advanced toward the future, the register of the clock is changed in Step S1106, the update is taken as OK in Step S1107, and the processing is terminated in Step S1108.

In Step S1104, it is checked whether the time change value of the clock is a rewind of the time before the latest cross-reference success time β. β is the same as one described as the recent cross-reference success time 530 in FIG. 5, or one described as β in Step S707 of FIG. 7, or one described as β in Step S807 of FIG. 8. The value is not lost even by power off or resetting.

If it is the rewind of the time before β, there is a possibility of a replay attack due to the time tampering shown in FIG. 10(b). Therefore, the time update is taken as NG (disallowed) in Step S1105, and the processing is ended in Step S1108.

When the branch of the determination Step S1104 is Yes, and the clock has not been initialized yet, consequently, all the functions of the OTP cross-referencing chip 400 are stopped. When the branch of the determination Step S1104 is Yes and the clock has already been initialized, the time is not changed from the current state. Thus, it is possible to eliminate the risk against such a replay attack as shown in FIG. 10.

When the determination Step S1104 is No, that is, when the time is changed to the future rather than the recent cross-reference success time β, the register of the clock is changed in Step S1106, the update is taken as OK in Step S1107, and the processing is normally completed in Step S1108.

When the authentication has not been successful even once in the past, the cross-reference success time β is given the value as the most past valve in the clock expression as the initial value. Therefore, the determination Step S1104 becomes always No, and the clock is always updated in Step S1106.

Thus, the control unit 401 is capable of setting the time of the clock. When the authentication calculation unit 405 determines that the authentication is successful for the first authentication request or the second authentication request, the current time of the clock is recorded as the authentication success time. The control unit 401 prohibits setting to the authentication success time or the time earlier than that, thereby making it possible to eliminate the risk against the replay attack.

Figure 2:
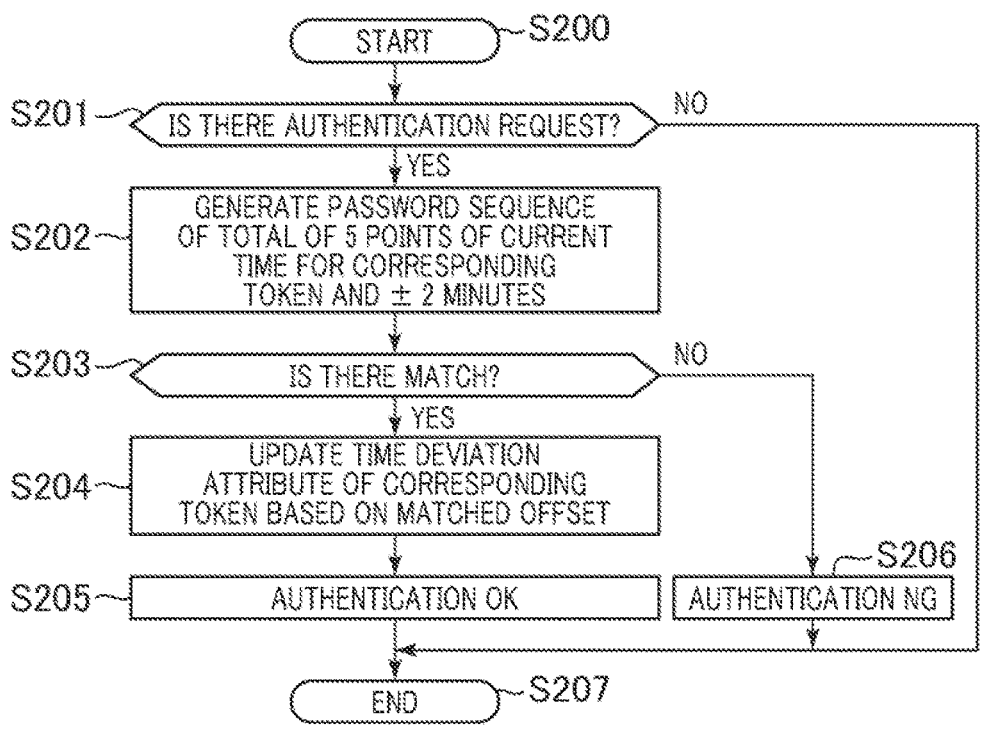
FIG. 2 is a diagram for outlining the technique of Non-Patent Literature 1.

Adopting the means presented in the above-described embodiment, the time synchronous function inside the server described in the online banking service of FIGS. 1 and 2 can be executed in the inexpensive OTP Cross-referencing chip, and a highly reliable authentication mechanism can be realized.

Accordingly, there is provided a contribution to improving social reliability by spreading a mechanism using a one-time password with a high security effect for embedded applications that used to be fixed key authentication.

Further, it is possible to take sufficient measures against the risk newly generated by incorporating the OTP cross-referencing chip, that is, the security risk due to time tampering (disguising).

Incidentally, it is conceivable that the above-described OTP cross-referencing chip 400 is stored in an electronic control unit (BCU) mounted on an automobile. In that case, one-time password cross-referencing can be realized at low cost in an in-vehicle electronic control unit which requires low cost.

Although the embodiments including the present invention have been specifically described above, it is needless to say that the present invention is not limited to the embodiments shown here and can be modified in various ways within the scope not departing from the gist thereof. stomach.

In particular, each of the above configurations, functions, processing units, etc. can also be realized as hardware by designing all or part of them with, for example, an integrated circuit. As shown as the embodiment, a PLC and a sequencer are also included in the category. Further, as an implementation example of another method, it can also be realized as software by executing a program in which a processor realizes each function, or it can also be realized as a device control language or firmware closely related to an integrated circuit.

In addition, in the above-described embodiment, the control lines and information lines indicate those considered necessary for explanation, and do not necessarily indicate all the control lines and information lines in terms of the product. All configurations may be interconnected.

As described above, the one-time password cross-reference can be realized at low cost by the technique described as the embodiment.

Specifically, it is possible to realize an OIP cross-referencing chip at low cost, and it becomes easy to disseminate one-time passwords in a device-incorporated field. This is an innovative technology for fields where the risk has arisen when the key or the tool containing the key information is lost, and the lock on the operated side cannot be easily replaced to eliminate the risk. Therefore, demand is expected to grow significantly.

Specifically, various applications such as shown in Patent Literature 2 become possible such as the safe change of the in-vehicle ECU program and data, realization of the keyless coin locker, cheap realization and popularization of the home delivery box, ensuring security of ATM (Automated Teller Machine) collection, ensuring the fairness of election ballot box counting, improving the security of the gates to important security locations such as nuclear power plants, and locking/unlocking safety devices for installations with destructive power.

LIST OF REFERENCE SIGNS

300 . . . user authentication & OTP issuing server, 302 . . . user, 303 . . . locking device, 311, 312 . . . . OTP (One Time Password), 400 . . . . OTP cross-referencing chip, 410 host CPU, 401 . . . . control unit, 402 . . . . I/O, 403 . . . clock unit, 404 . . . crystal oscillator, 405 . . . authentication calculation unit, 406 . . . non-volatile memory, 407 . . . passphrase storage warehouse, 504 . . . passphrase, 510 . . . minor password FIFO, 520 . . . major password memory, 530 . . . recent cross-reference success time register, 901 . . . wireless connection time source, 902 . . . wired connection time source, 1000 . . . fake and recording device.

The invention claimed is:

1. A cross-referencing device for improving password based authentication in a computer system, the cross-referencing device comprising:
a built-in clock;
a memory;

a central processing unit (CPU) that is communicatively coupled to the built-in clock and the memory, wherein the CPU is configured to:

determine a current time based on the built-in clock, generate a plurality of time-synchronized first cross-referencing one-time passwords that are each generated based on a predetermined time relationship with the current time and a respective offset from the current time, wherein the plurality of time-synchronized first cross-referencing one-time passwords include a first cross-referencing one-time password for the current time and contains N+1 time-synchronized first cross-referencing one-time passwords, write the plurality of time-synchronized first cross-referencing one-time passwords to the memory, determine that an authentication is successful when an authentication target one-time password received in a first authentication request matches with any of the plurality of time-synchronized first cross-referencing one-time passwords in the memory, wherein the first authentication request corresponds to a time that is different than the current time, in response to the authentication being successful, store the current time as an authentication success time, prohibit the built-in clock from being set to a time earlier than the authentication success time, and permit the built-in clock to be set to a time that is later than the authentication success time.

2. The cross-referencing device according to claim 1, wherein N is an even number, and wherein the CPU is further configured to:

determine that the respective offset is a time point advanced by N/2 pieces in a predetermined time unit from the current time.

3. The cross-referencing device according to claim 1, wherein the CPU is further configured to:

correct a time of the built-in clock based on a particular time corresponding to the first authentication request.

4. The cross-referencing device according to claim 1, wherein:

when a respective time point corresponding to a respective time-synchronized first cross-referencing one-time password written in the memory coincides with the current time ticked at a second time interval longer than a first time interval, the CPU is further configured to write the respective time-synchronized first cross-referencing one-time password in a second storage area as a second cross-referencing one-time password, and when the authentication target one-time password received in a second authentication request matches with the second cross-referencing one-time password, the CPU is further configured to determine that authentication is successful.

5. The cross-referencing device according to claim 4, wherein:

when the authentication target one-time password matches the second cross-referencing one-time password and the authentication is successful, the CPU is configured to prohibit authentication by the second authentication request until the second cross-referencing one-time password in the second storage area is then updated.

6. The cross-referencing device according to claim 4, wherein the CPU is further configured to:

count a number of times of authentication failures in the first authentication request, and permits the authentication of the second authentication request when the number of times of the authentication failures reaches a predetermined number of times.

7. The cross-referencing device according to claim 4, wherein the CPU is further configured to:

count a number of times of authentication failures in the second authentication request, and when the number of times of the authentication failures reaches a predetermined number of times, and prohibit authentication by the second authentication request until the second cross-referencing one-time password in the second storage area is then updated.

8. The cross-referencing device according to claim 1, wherein the memory has a common key storage unit which stores a common key used for generation of the plurality of time-synchronized first cross-referencing one-time passwords.

9. The cross-referencing device according to claim 1, which is stored in an electronic control device mounted in an automobile.

* * * * *